United States Patent
Ikeshita et al.

(10) Patent No.: US 12,500,275 B2
(45) Date of Patent: Dec. 16, 2025

(54) METHOD OF MANUFACTURING BATTERY

(71) Applicant: Prime Planet Energy & Solutions, Inc., Tokyo (JP)

(72) Inventors: Kazuya Ikeshita, Minamiawaji (JP); Yoshiyuki Furukoji, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 657 days.

(21) Appl. No.: 17/882,605

(22) Filed: Aug. 8, 2022

(65) Prior Publication Data

US 2023/0046940 A1    Feb. 16, 2023

(30) Foreign Application Priority Data

Aug. 11, 2021    (JP) ................. 2021-131372

(51) Int. Cl.
  *H01M 10/0587*    (2010.01)
  *B65H 39/16*    (2006.01)
  *H01M 10/0525*    (2010.01)

(52) U.S. Cl.
  CPC ........ *H01M 10/0587* (2013.01); *B65H 39/16* (2013.01); *H01M 10/0525* (2013.01); *B65H 2301/5151* (2013.01); *B65H 2406/33* (2013.01)

(58) Field of Classification Search
  CPC ........ B65H 18/0212; B65H 2301/5151; B65H 2406/33; B65H 2801/72; B65H 39/16; B65H 75/28; B65H 75/32; H01M 10/0409; H01M 10/0431
  See application file for complete search history.

(56) References Cited

U.S. PATENT DOCUMENTS

| | | | |
|---|---|---|---|
| 2016/0322649 A1 | 11/2016 | Swiegers et al. | |
| 2023/0046940 A1* | 2/2023 | Ikeshita | H01M 10/0409 |
| 2023/0048065 A1* | 2/2023 | Ikeshita | H01M 50/403 |
| 2023/0048342 A1* | 2/2023 | Ikeshita | H01M 50/469 |
| 2023/0050718 A1* | 2/2023 | Ikeshita | H01M 10/0525 |

FOREIGN PATENT DOCUMENTS

| | | |
|---|---|---|
| CN | 112736296 A | 4/2021 |
| JP | S6037677 A | 2/1985 |
| JP | 2001338693 A | 12/2001 |
| JP | 2006216520 A | 8/2006 |
| JP | 2007188855 A | 7/2007 |
| JP | 2009193750 A | 8/2009 |
| JP | 2009289661 A | 12/2009 |
| JP | 2011253701 A | 12/2011 |
| JP | 2014222595 A | 11/2014 |
| JP | 2017501542 A | 1/2017 |

\* cited by examiner

*Primary Examiner* — Minh N Trinh
(74) *Attorney, Agent, or Firm* — HAUPTMAN HAM, LLP

(57) ABSTRACT

A method of manufacturing a battery is disclosed. The method includes the steps of (A) suction-attaching the first separator to a winding core, (B) winding the first separator on the winding core, and (C) removing the wound electrode assembly from the winding core. The winding core includes a first group of holes and a second group of holes each formed in its outer circumferential surface. In step (A), suction is applied to the first separator through at least one of the first group of holes and the second group of holes, to suction-attach the first separator to the winding core. The first group of holes and the second group of holes are configured to be controllable so as to cause suction and gas discharge independently from each other.

10 Claims, 11 Drawing Sheets

METHOD OF MANUFACTURING BATTERY

The present application claims priority from Japanese Patent Application No. 2021-131372 filed on Aug. 11, 2021, which is incorporated by reference herein in its entirety.

BACKGROUND

The present invention relates to a method of manufacturing a battery.

JP 2006-216520 A discloses a winding core used for a winding apparatus that is used in manufacturing a strip-shaped material winding body such as a secondary battery. The winding core disclosed in the publication is provided with a plurality of suction/discharge holes formed at regular intervals in its outer surface. It is stated that, when winding battery element materials onto the winding core, the battery element materials such as a separator can be suction-attached to the winding core by performing suction through the suction/discharge holes. It is also stated that, when removing the winding core after completing the winding of the battery element materials, air is discharged through the suction/discharge holes to produce an air layer around the outer circumference of the winding core, so that the winding core can be removed.

SUMMARY

According to the knowledge of the present inventors, there is still room for improvement in the method of producing a wound electrode assembly in which a negative electrode plate, a positive electrode plate, and separators are wound. The present inventors intend to provide a method of more efficiently manufacturing a wound electrode assembly.

The present disclosure discloses a method of manufacturing a battery including a wound electrode assembly in which a first separator, a negative electrode plate, a second separator, and a positive electrode plate are wound together. The method of manufacturing a battery includes the steps of (A) suction-attaching the first separator to a winding core, (B) winding the first separator on the winding core, and (C) removing the wound electrode assembly from the winding core. The winding core includes a first group of holes and a second group of holes each formed in its outer circumferential surface. In step (A), suction is applied to the first separator through at least one of the first group of holes and the second group of holes, to suction-attach the first separator to the winding core. The first group of holes and the second group of holes are configured to be controllable so as to cause suction and gas discharge independently from each other. The embodiment as described above makes it possible to improve production efficiency in manufacturing the wound electrode assembly.

In step (A), suction may be applied to the first separator through at least one of the first group of holes and the second group of holes, to suction-attach the first separator to the winding core.

In step (A), suction may be applied to at least one of the first separator and the second separator additionally through the second group of holes to suction-attach the at least one of the first separator and the second separator.

In step (C), gas may be discharged through at least the second group of holes of the first group of holes and the second group of holes.

In step (C), gas may be discharged through the first group of holes.

The first separator and the second separator may be cut on the winding core with the first separator and the second separator being retained on the winding core.

The winding core may include a groove formed along a direction in which the winding core extends. The first separator and the second separator may be cut at a location facing the groove, with the first separator and the second separator being retained on the winding core.

The first separator and the second separator each may have a width of greater than or equal to 25 cm.

The winding core may include a first component and a second component. At least one of the first component and the second component may be movable in a radial direction of the winding core so as to change a diameter of the winding core.

The first group of holes and the second group of holes may be formed in the first component.

Alternatively, the first group of holes may be formed in the first component, and the second group of holes may be formed in the second component.

DETAILED DESCRIPTION

Embodiments of the invention according to the present disclosure will be described hereinbelow. It should be noted, however, that the disclosed embodiments are, of course, not intended to limit the invention. The present invention is not limited to the embodiments described herein unless specifically stated otherwise. The drawings are depicted schematically and do not necessarily accurately depict actual objects. The features and components that exhibit the same effects are designated by the same reference symbols as appropriate, and the description thereof will not be repeated.

Figure 1:
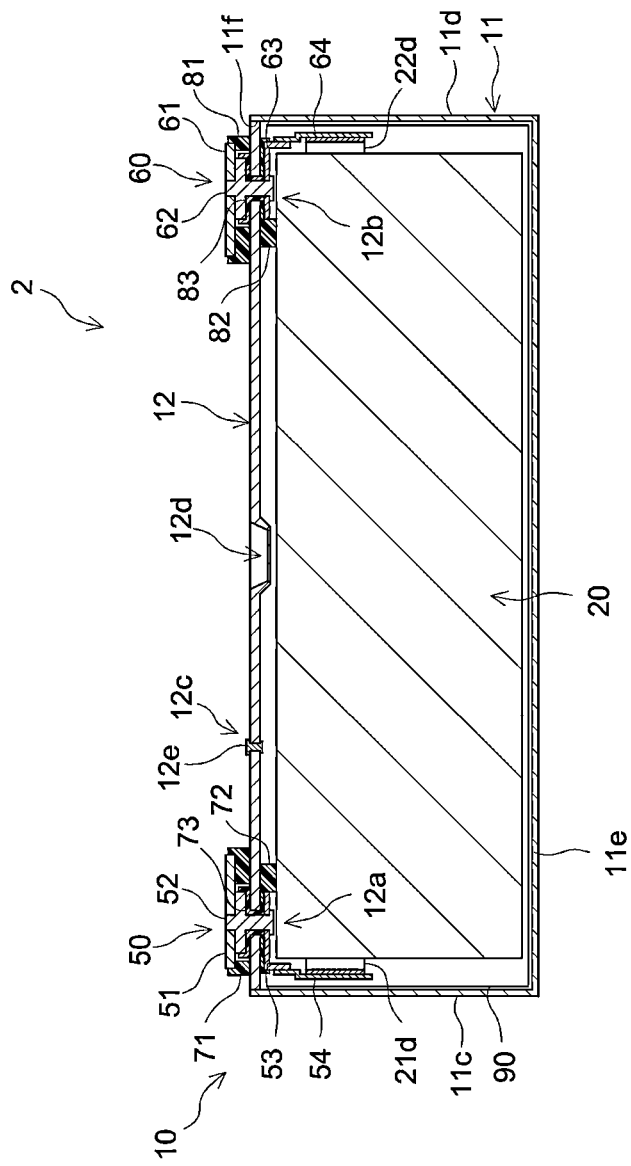
FIG. 1 is a vertical sectional view of a battery 2.

FIG. 1 is a vertical sectional view of a battery 2. FIG. 1 schematically shows the battery 2 from which the front-side wider surface of a battery case 10 is virtually removed so that the inside of the battery case 10 can be seen. The battery 2 is one embodiment of the battery produced by the manufacturing method disclosed herein. The battery 2 includes a wound electrode assembly 20 accommodated in a battery case 10. It should be noted that the embodiments of the battery manufactured by the method disclosed herein are not limited to the one shown in FIG. 1.

Battery 2

The battery 2 shown in FIG. 1 is a horizontally elongated prismatic battery. As illustrated in FIG. 1, the battery 2 includes the battery case 10, the wound electrode assembly 20, a positive electrode terminal 50, and a negative electrode terminal 60. The battery case 10 includes an outer container 11 and a sealing plate 12.

Outer Container 11

The outer container 11 is a closed-bottom prismatic case having a horizontally elongated rectangular-shaped enclosing space. The outer container 11 mainly encloses the wound electrode assembly 20. The outer container 11 includes a substantially rectangular-shaped bottom surface 11e, a pair of opposing wider surfaces 11a and 11b (not shown) provided along the longer sides of the bottom surface 11e, and a pair of opposing narrower surfaces 11c and 11d provided along the shorter sides of the bottom surface 11e. An open end 11f is formed facing the bottom surface 11e to accommodate the wound electrode assembly 20. The sealing plate 12 is attached to the open end 11f.

Sealing Plate 12

The sealing plate 12 is fitted to the open end 11f of the battery case 10. The sealing plate 12 is composed of a substantially rectangular-shaped plate material that can be fitted to the open end 11f of the outer container 11. The sealing plate 12 is a substantially rectangular-shaped plate material. In the sealing plate 12, a mounting hole 12a for mounting a positive electrode terminal 50 is formed near one longitudinal end thereof, and a mounting hole 12b for mounting a negative electrode terminal 60 is formed near the opposite end.

A filling port 12c and a gas vent valve 12d are provided at a central portion of the sealing plate 12. The filling port 12c is a through hole provided for filling a non-aqueous electrolyte solution into the interior of the battery case 10 that has been hermetically sealed. After filling the non-aqueous electrolyte solution, the filling port 12c is sealed with a sealing member 12e fitted therein. The gas vent valve 12d is a thinned portion that is designed to rupture (i.e., to open) when a large amount of gas is generated inside the battery case 10, so as to expel the gas.

For the non-aqueous electrolyte solution, it is possible to use any non-aqueous electrolyte solution used for conventionally known secondary batteries without any particular limitation. For example, the non-aqueous electrolyte solution may be prepared by dissolving a supporting salt into a non-aqueous solvent. Examples of the non-aqueous solvent include carbonate-based solvents, such as ethylene carbonate, dimethyl carbonate, and ethyl methyl carbonate. Examples of the supporting salt include fluorine-containing lithium salts, such as $LiPF_6$.

Positive Electrode Terminal 50 and Negative Electrode Terminal 60

The positive electrode terminal 50 and the negative electrode terminal 60 are attached to the sealing plate 12. The wound electrode assembly 20 is enclosed in the outer container 11, with the wound electrode assembly 20 being attached to the positive electrode terminal 50 and the negative electrode terminal 60. The positive electrode terminal 50 includes an external terminal 51, a shaft member 52, an internal terminal 53, a current collecting member 54, a first insulator 71, a second insulator 72, and a gasket 73. The negative electrode terminal 60 includes an external terminal 61, a shaft member 62, an internal terminal 63, a current collecting member 64, a first insulator 81, a second insulator 82, and a gasket 83. The first insulators 71, 81, the second insulators 72, 82, and the gaskets 73, 83 are each composed of an insulating material. The first insulators 71, 81 and the second insulators 72, 82 are each composed of a resin having required rigidity. The gaskets 73 and 83 are members that are fitted respectively to the mounting holes 12a and 12b of the sealing plate 12 and each have required flexibility.

The respective shaft members 52 and 62 of the positive electrode terminal 50 and the negative electrode terminal 60 are fitted to the mounting holes 12a and 12b of the sealing plate 12 with the respective gaskets 73 and 83 interposed therebetween. The external terminals 51 and 61 are attached to the outside of the sealing plate 12 with the first insulators 71 and 81 interposed therebetween. Each of the external terminals 51 and 61 includes a mounting hole, and is fitted to the outer end of each of the shaft members 52 and 62. The internal terminals 53 and 63 are attached to the inside of the sealing plate 12 with the second insulators 72 and 82 interposed therebetween. Each of the internal terminals 53 and 63 includes a mounting hole, and is fitted to the inner end of each of the shaft members 52 and 62. The inner end of each of the shaft members 52 and 62 is press-fitted to the circumference of the mounting hole of each of the internal terminals 53 and 63. Each of the current collecting members 54 and 64 is attached to one end of each of the internal terminals 53 and 63.

Thus, the positive electrode terminal 50 and the negative electrode terminal 60 are attached to the sealing plate 12, with the positive electrode terminal 50 and the negative electrode terminal 60 being electrically insulated by the first insulators 71, 81, the second insulators 72, 82, and the interposed gaskets 73, 83, and with hermeticity being ensured. Also, an electrically conductive path is formed by the external terminals 51, 61, the shaft members 52, 62, the internal terminals 53, 63, and the current collecting members 54, 64. The wound electrode assembly 20 is fitted to the current collecting members 54 and 64. With the wound electrode assembly 20 being attached to the sealing plate 12 in this way, the wound electrode assembly 20 is enclosed in the outer container 11. It is also possible that a plurality of wound electrode assemblies 20 may be attached to one sealing plate 12. It is also possible that a plurality of wound electrode assemblies 20 may be accommodated in one battery case 10.

Wound Electrode Assembly 20

Figure 2:
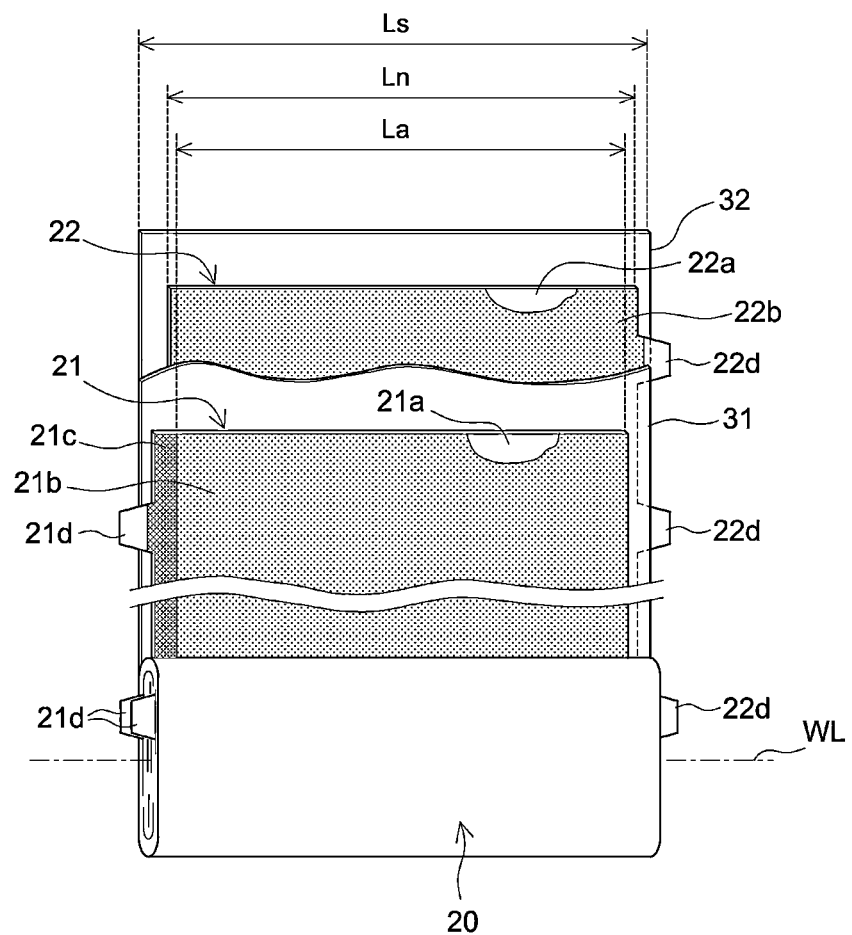
FIG. 2 is a schematic view of a wound electrode assembly 20.

FIG. 2 is a schematic view of the wound electrode assembly 20. FIG. 2 shows the wound electrode assembly 20 one end of which is unrolled. In the wound electrode assembly 20, for example, as illustrated in FIG. 2, a positive electrode plate 21, a first separator 31, a negative electrode plate 22, and a second separator 32, each of which is in a long strip shape, are stacked successively with their longitudinal axes aligned with each other and are wound around a winding axis WL that is set in a widthwise direction.

The positive electrode plate 21 includes a positive electrode substrate 21a, a positive electrode active material layer 21b, a protective layer 21c, and tabs 21d. The positive electrode substrate 21a is the substrate material of the positive electrode plate 21. The positive electrode substrate 21a is formed of a predetermined metal foil (for example, aluminum foil). The positive electrode active material layer 21b is formed with a constant width on both faces of the positive electrode substrate 21a except for one lateral end portion thereof. The protective layer 21c is formed on both sides of the positive electrode plate 21. The protective layer 21c is formed in a portion of the positive electrode substrate 21a that is other than the portion on which the positive electrode active material layer 21b is formed. In addition, the tabs 21d protruding in a lateral direction are formed at a lateral end of the positive electrode substrate 21a on which the protective layer 21c is formed. The tabs 21d with a predetermined width protrude partially from the lateral end on which the protective layer 21c is formed, so that the positive electrode substrate 21a is exposed.

The positive electrode active material layer 21b is a layer containing a positive electrode active material. In a lithium-ion secondary battery, for example, the positive electrode active material is a material that is capable of releasing lithium ions during charge and absorbing lithium ions during discharge, such as lithium-transition metal composite materials. Generally, other than the lithium-transition metal composite materials, various materials have been proposed for use as the positive electrode active material, and the positive electrode active material is not limited to any particular material. Suitable examples of the positive electrode active material include, for example, lithium-transition metal composite oxides. Among the lithium-transition metal composite oxides, particularly suitable are lithium-transition metal composite oxides containing at least one transition metal selected from the group consisting of nickel (Ni), cobalt (Co), and manganese (Mn). Specific examples include lithium-nickel-cobalt-manganese composite oxide (NCM), lithium-nickel composite oxide, lithium-cobalt composite oxide, lithium-manganese composite oxide, lithium-nickel-manganese composite oxide, lithium-nickel-cobalt-aluminum composite oxide (NCA), and lithium-iron-nickel-manganese composite oxide. Suitable examples of lithium-transition metal composite oxides that do not contain Ni, Co, or Mn include lithium-iron-phosphate composite oxide (LFP).

It should be noted that the term "lithium-nickel-cobalt-manganese composite oxide" in the present description means to include oxides that contain additional elements other than the main constituent elements (Li, Ni, Co, Mn, and O). Examples of such additional elements include transition metal elements and main group metal elements, such as Mg, Ca, Al, Ti, V, Cr, Si, Y, Zr, Nb, Mo, Hf, Ta, W, Na, Fe, Zn, and Sn. The additional elements may include metalloid elements, such as B, C, Si, and P, and non-metallic elements, such as S, F, Cl, Br, and I. The positive electrode active material layer 21b may contain addition agents other than the positive electrode active material. Examples of such addition agents may include conductive agents and binders. Examples of the conductive agents include carbon materials such as acetylene black (AB). Examples of the binders include resin binders such as polyvinylidene fluoride (PVdF). When the total solid content of the positive electrode active material layer 21b is 100 mass %, the content of the positive electrode active material may be approximately greater than or equal to 80 mass %, and typically greater than or equal to 90 mass %.

The protective layer 21c is a layer configured to reduce electrical conductivity. Such a protective layer 21c is provided in a region adjacent to an edge portion of the positive electrode active material layer 21b. The protective layer 21c may serve to prevent the positive electrode substrate 21a and the negative electrode active material layer 22b from coming into contact with each other directly and causing internal short circuits when either of the separators 31 and 32 is damaged. For the protective layer 21c, it is possible to form a layer containing electrically insulative ceramic particles, for example. Examples of such ceramic particles include: inorganic oxides, such as alumina ($Al_2O_3$), magnesia (MgO), silica ($SiO_2$), and titania ($TiO_2$); nitrides, such as aluminum nitride and silicon nitride; metal hydroxides, such as calcium hydroxide, magnesium hydroxide, and aluminum hydroxide; clay minerals, such as mica, talc, boehmite, zeolite, apatite, and kaoline; and glass fibers. Taking electrical insulation and heat resistance into consideration, suitable among them are alumina, boehmite, aluminum hydroxide, silica, and titania. The protective layer 21c may contain a binder for fixing the ceramic particles onto the surface of the positive electrode substrate 21a. Examples of such a binder include resin binders such as polyvinylidene fluoride (PVdF). The protective layer 21c may contain a trace amount of conductive agent (for example, a carbon material such as carbon black). By adding the conductive agent, the protective layer may be made to have slight electrical conductivity. The amount of the conductive agent to be added may be adjusted to an amount that can obtain required electrical conductivity. Note that the protective layer is not an essential constituent component of the positive electrode plate. That is, the secondary battery disclosed herein may also use a positive electrode plate that is not provided with a protective layer.

The negative electrode plate 22 includes a negative electrode substrate 22a, a negative electrode active material layer 22b, and tabs 22d. The negative electrode substrate 22a is the substrate material of the negative electrode plate 22. The negative electrode substrate 22a is formed of a predetermined metal foil (for example, copper foil). The negative electrode active material layer 22b is formed on both sides of the negative electrode substrate 22a substantially along the entire width of the negative electrode substrate 22a. The negative electrode substrate 22a is provided with the tabs 22d protruding from one lateral end thereof. The tabs 22d with a predetermined width protrude partially from the one lateral end of the negative electrode substrate 22a.

The negative electrode active material layer 22b is a layer containing a negative electrode active material. The negative electrode active material is not particularly limited, as long as the negative electrode active material is able to reversibly absorb and release charge carriers in relation to the above-described positive electrode active material. Examples of the negative electrode active material include carbon materials and silicon based materials. The carbon materials may be, for example, graphite, hard carbon, soft carbon, amorphous carbon, and the like. It is also possible to use amorphous carbon-coated graphite, in which the surface of graphite is coated with amorphous carbon, or the like. Examples of the silicon based materials include silicon and silicon oxide (silica). The silicon based materials may also contain other metal elements (such as alkaline-earth metals) and oxides thereof. The negative electrode active material layer 22b may contain addition agents other than the negative electrode active material. Examples of such addition agents may include binders and thickening agents. Specific examples of the binders include rubber-based binders, such as styrene-butadiene rubber (SBR). Specific examples of the thickening agents include carboxymethylcellulose (CMC). When the total solid content of the negative electrode active material layer 22b is 100 mass %, the content of the negative electrode active material is approximately greater than or equal to 30 mass %, and typically greater than or equal to 50 mass %. The negative electrode active material may account for greater than or equal to 80 mass %, or greater than or equal to 90 mass %, of the negative electrode active material layer 22b.

Each of the separators 31 and 32 may be formed of, for example, an electrolyte permeable porous resin sheet with required heat resistance. Various embodiments of the separators 31 and 32 have been proposed, and the separators 31 and 32 are not particularly limited. Suitable examples of the separators 31 and 32 include a separator including a porous substrate layer made of resin such as polyolefin resin [for example, polyethylene (PE) or polypropylene (PP)]. It is also possible that a coat layer may be formed on one side or both sides of the porous substrate layer as appropriate. The coat layer may include an adhesive layer and a porous surface layer containing electrically insulative inorganic material. The porous surface layer is excellent in heat resistance and is therefore able to prevent shrinkage and breakage of the separators 31 and 32 due to temperature increase. Examples of the inorganic materials for the porous surface layer include ceramic particles of alumina, boehmite, aluminum hydroxide, titania, and the like. In addition, the porous surface layer contains a binder for binding the ceramic particles. The binder may be resin binders such as polyvinylidene fluoride (PVdF) and acrylic resins. It should be noted that the two separators 31 and 32 used in the present embodiment may be constructed of either the same or different materials.

As illustrated in FIG. 2, the negative electrode active material layer 22b of the negative electrode plate 22 may cover the positive electrode active material layer 21b of the positive electrode plate 21 with the separators 31 and 32 interposed therebetween. The separators 31 and 32 may further cover the positive electrode active material layer 21b of the positive electrode plate 21 and the negative electrode active material layer 22b of the negative electrode plate 22. Although not shown in the drawings, the lengths of the positive electrode plate 21, the negative electrode plate 22, and the separators 31, 32 may satisfy the relation: the length of separators 31, 32>the length of negative electrode plate 22>the length of positive electrode plate 21. The width La of the positive electrode active material layer 21b, the width Ln of the negative electrode active material layer 22b, and the width Ls of the separators 31, 32 may satisfy the relation: Ls>Ln>La. In the portion in which the positive electrode plate 21 and the negative electrode plate 22 are stacked, a portion on which the positive electrode active material layer 21b is formed is covered by the negative electrode active material layer 22b. In addition, the protective layer 21c is formed on a portion of the positive electrode plate 21 in which the negative electrode active material layer 22b overlaps the positive electrode plate 21 but does not oppose the positive electrode active material layer 21b.

As illustrated in FIG. 2, the tabs 21d of the positive electrode plate 21 protrude from one lateral end of the separators 31 and 32. The positive electrode plate 21 is provided with a plurality of tabs 21d arranged along the longitudinal axis at a predetermined pitch. The tab 22d of the negative electrode plate 22 protrude from the other lateral end of the separators 31 and 32. The negative electrode plate 22 is provided with a plurality of tabs 22d arranged along the longitudinal axis at a predetermined pitch. The plurality of tabs 21d of the positive electrode plate 21 and the plurality of tabs 22d of the negative electrode plate 22 are arranged at a predetermined pitch so that they are located generally at the matching positions after the positive electrode plate 21 and the negative electrode plate 22 are wound into the wound electrode assembly 20. The tabs 21d of the positive electrode plate 21 and the tabs 22d of the negative electrode plate 22 may be formed at the respective stages where the positive electrode plate 21 and the negative electrode plate 22 are prepared. It is also possible that the tabs 21d of the positive electrode plate 21 and the tabs 22d of the negative electrode plate 22 may be formed by cutting out portions of the electrode plates after the wound electrode assembly 20 has been wound.

As illustrated in FIGS. 1 and 2, the wound electrode assembly 20 is placed into the outer container 11 from the open end 11f, to which the sealing plate 12 is to be fitted. For this reason, the wound electrode assembly 20 is in a flat shape corresponding to the shape of the open end 11f. When preparing the wound electrode assembly 20 in such a fashion, the wound electrode assembly 20 may be wound on a flat-shaped mandrel. Alternatively, when preparing the wound electrode assembly 20, the wound electrode assembly 20 may be wound on a cylindrical-shaped mandrel and thereafter press-formed into a flat shape. The wound electrode assembly 20 and the outer container 11 are electrically insulated from each other by an insulating sheet 90 made of resin and disposed between the wound electrode assembly 20 and the outer container 11. The insulating sheet 90 is a resinous sheet and is bent into a box shape so as to surround the wound electrode assembly 20. Note that FIG. 1 shows the battery 2 from which the front-side wider surface of the insulating sheet 90 is also removed.

Winding Machine 100

Next, a winding machine 100 will be described. FIGS. 3 to 6 each show a schematic view of the winding machine 100. The winding machine 100 is an example of the winding machine that embodies a method of manufacturing a battery as disclosed herein. FIGS. 3 to 6 each show a view of a turret 120 portion of the winding machine 100, which is viewed from the far end of a rotational axis C1 of the turret 120.

Figure 3:
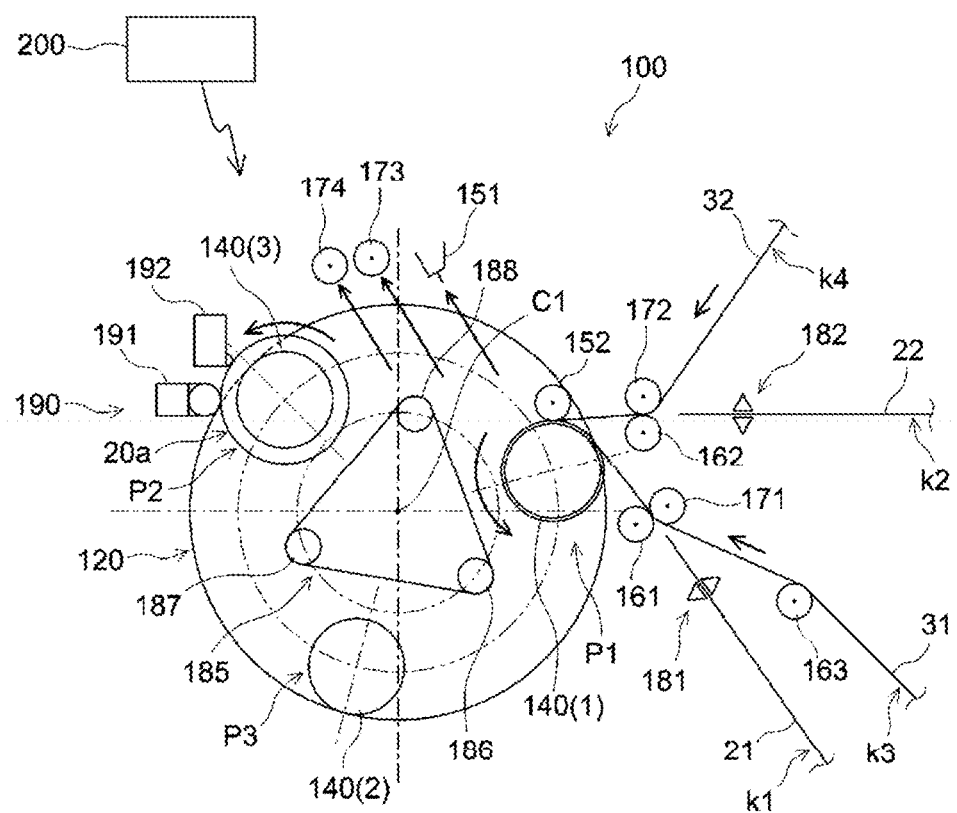
FIG. 3 is a schematic view of a winding machine 100.
Figure 4:
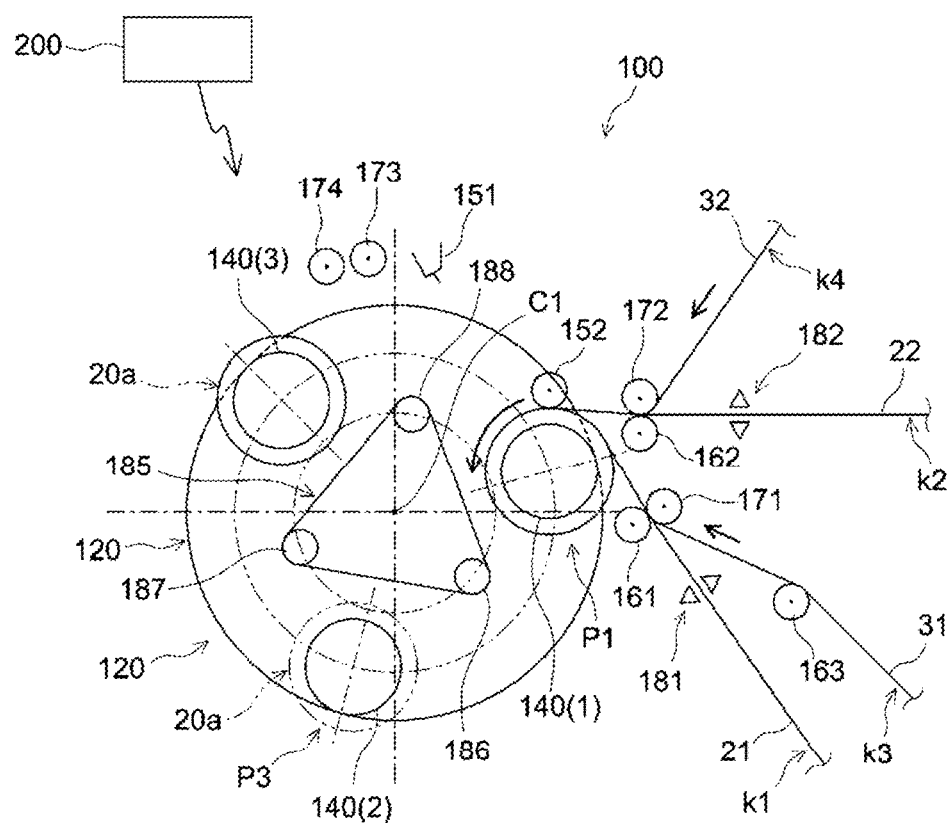
FIG. 4 is another schematic view of the winding machine 100.
Figure 5:
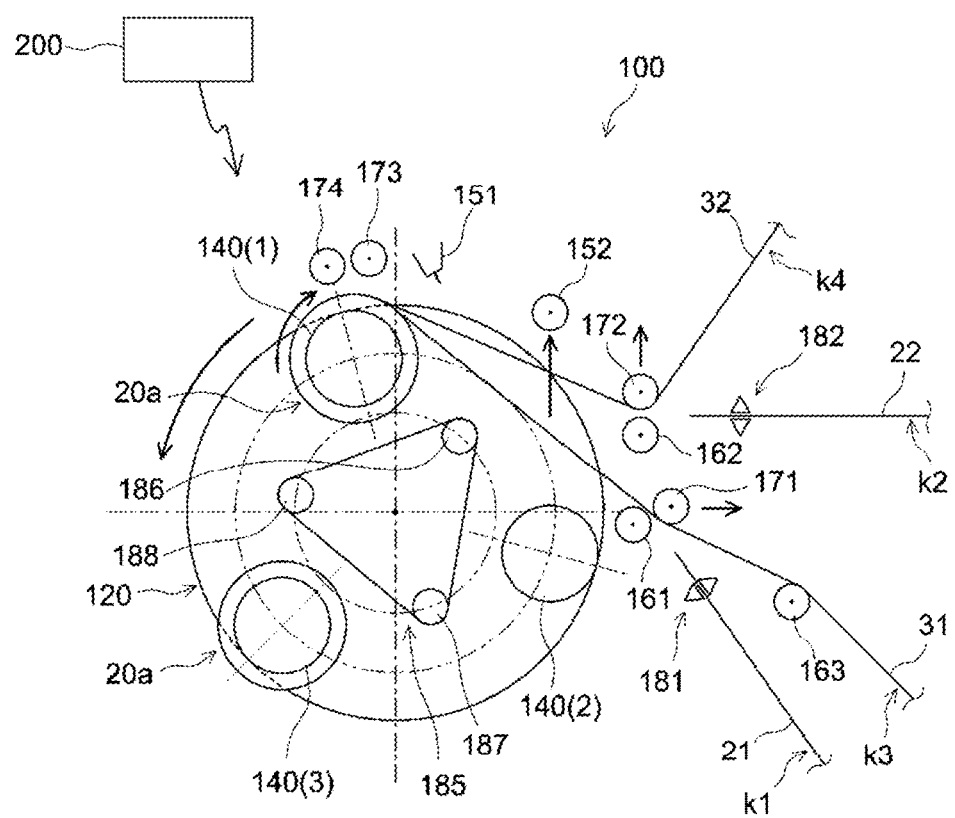
FIG. 5 is still another schematic view of the winding machine 100.
Figure 6:
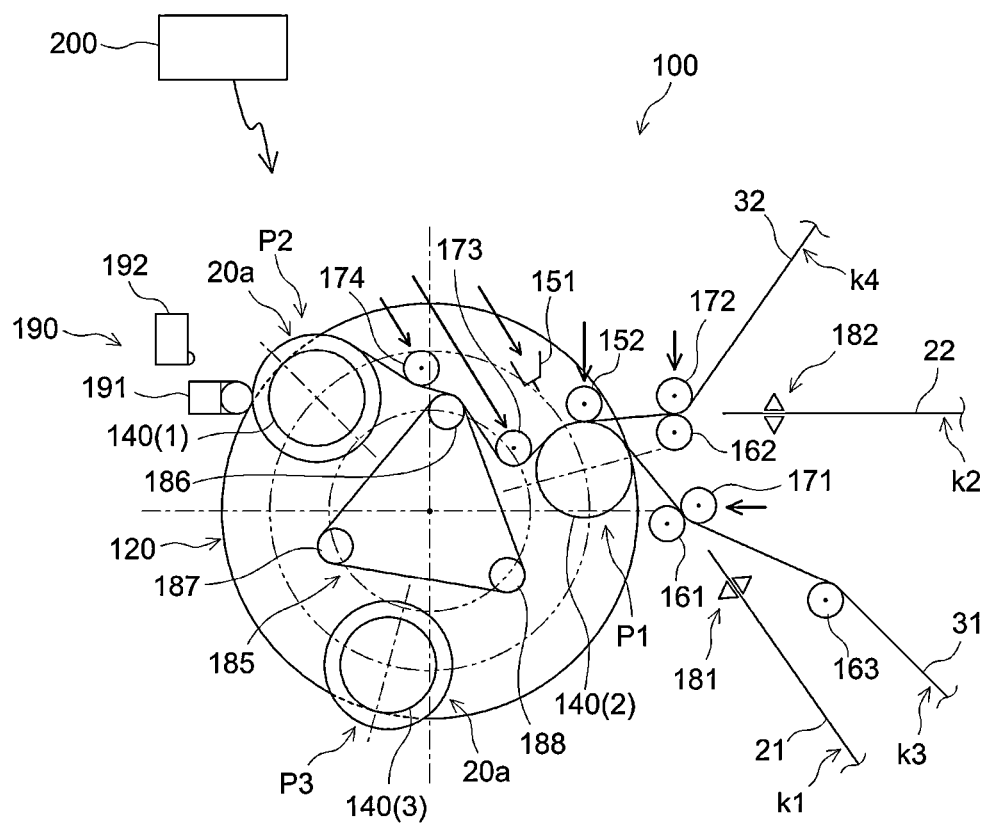
FIG. 6 is still another schematic view of the winding machine 100.

FIG. 3 illustrates a stand-by state, in which the winding machine 100 starts to newly wind a positive electrode plate 21 and a negative electrode plate 22. FIG. 4 illustrates a state in which the positive electrode plate 21 and the negative electrode plate 22 are being newly wound by the winding machine 100. FIG. 5 illustrates a state in which a winding core 140, on which the positive electrode plate 21 and the negative electrode plate 22 have been wound, is moved from a first position P1 to a second position P2. FIG. 6 illustrates a state in which the winding core 140, on which the positive electrode plate 21 and the negative electrode plate 22 have been wound, is moved to the second position P2, another winding core is moved to the first position P1, and the separators 31 and 32 are cut.

As illustrated in FIG. 3, the winding machine 100 is an apparatus for winding the positive electrode plate 21, the negative electrode plate 22, and the separators 31 and 32. The turret 120 is provided with a plurality of winding cores 140(1)-(3), around which a positive electrode plate 21, a negative electrode plate 22, and separators 31 and 32 are to be wound.

The winding machine 100 includes, as illustrated in FIG. 3, transfer paths k1 to k4, a turret 120, a plurality of winding cores 140(1)-(3), a cutter 151, a presser roller 152, a plurality of stationary rollers 161 to 163, a plurality of movable rollers 171 to 174, a first chuck 181, a second chuck 182, an index unit 185 provided on the turret 120, index rollers 186 to 188 provided in the index unit 185, a winding termination device 190, and a controller 200. The positive electrode plate 21, the negative electrode plate 22, and the separators 31 and 32 are prepared in such a condition that they are wound around respective reels (not shown) or the like. Each of the constituent components of the winding machine 100 may include a required actuator when appropriate. The controller 200 is configured to control various constituent components of the winding machine 100 so that required operations can be performed at predetermined timing according to predetermined programs. The controller 200 may be embodied by a computer such as a microcontroller, for example.

Transfer Paths k1 to k4

The transfer path k1 is a path in which the positive electrode plate 21 is delivered from a reel toward the turret 120. The transfer path k2 is a path in which the negative electrode plate 22 is delivered from the reel toward the turret 120. The transfer path k3 is a path in which the first separator 31 is delivered from the reel toward the turret 120. The transfer path k4 is a path in which the second separator 32 is delivered from the reel toward the turret 120. The positive electrode plate 21, the negative electrode plate 22, the first separator 31, and the second separator 32 are each in a strip shape, and they are delivered along predetermined transfer paths k1 to k4, respectively. The transfer path k1 of the positive electrode plate 21 merges with the transfer path k3 of the first separator 31 before reaching the winding core 140 disposed at the first position P1. The transfer path k2 of the negative electrode plate 22 merges with the transfer path k4 of the second separator 32 before reaching the winding core 140 disposed at the first position P1. The transfer paths k1 to k4 may be provided with, for example, a dancer roller mechanism that takes up the slack in the positive electrode plate 21, the negative electrode plate 22, the first separator 31, and the second separator 32 that are delivered, a tensioner that adjusts their tensions, and the like, as appropriate.

Turret 120

The turret 120 is a rotary disk the rotational axis of which is disposed at its center C1. A plurality (three in this embodiment) of winding cores 140 are disposed on the turret 120. The plurality of winding cores 140 are substantially cylindrical-shaped mandrels that are rotatable independently from each other. In this embodiment, the axes of the plurality of winding cores 140 are disposed so as to be parallel to the central axis of the turret 120. The turret 120 is provided with three winding cores 140, a first winding core 140(1), a second winding core 140(2), and a third winding core 140(3). The first winding core 140(1), the second winding core 140(2), and the third winding core 140(3) are disposed around the central axis of the turret 120 so as to be circumferentially equally spaced from each other. The first winding core to the third winding core 140(1)-(3) each have the same configuration. Although not shown in the drawings, the turret 120 is provided with a required actuator (for example, a servomotor) to rotate by an appropriate angle at appropriate timing.

A first position P1, a second position P2, a third position P3 are predetermined around the axis of the center C1 of the turret 120. In FIG. 3, the first winding core 140(1) is disposed at the first position P1, the third winding core 140(3) is disposed at the second position P2, and the second winding core 140(2) is disposed at the third position P3. The positions of the first winding core to the third winding core 140(1)-(3) are not fixed to the positions shown in FIG. 3. In this embodiment, the turret 120 rotates counterclockwise. The first winding core to the third winding core 140(1)-(3) also rotate counterclockwise. The first winding core to the third winding core 140(1)-(3) move successively from one position to another, from the first position P1, to the second position P2, and to the third position P3, due to rotation of the turret 120. Although not shown in the drawings, each of the first winding core to the third winding core 140(1)-(3) is provided with a required actuator (for example, a servomotor) to rotate at an appropriate speed at appropriate timing. Herein, each of the first winding core to the third winding core 140(1)-(3) is referred to as a winding core 140 when no distinction is necessary. However, when the first winding core to the third winding core 140(1)-(3) need to be distinguished, they are respectively designated as a winding core 140(1), a winding core 140(2) and a winding core 140(3) as appropriate.

Winding Core 140

Figure 7:
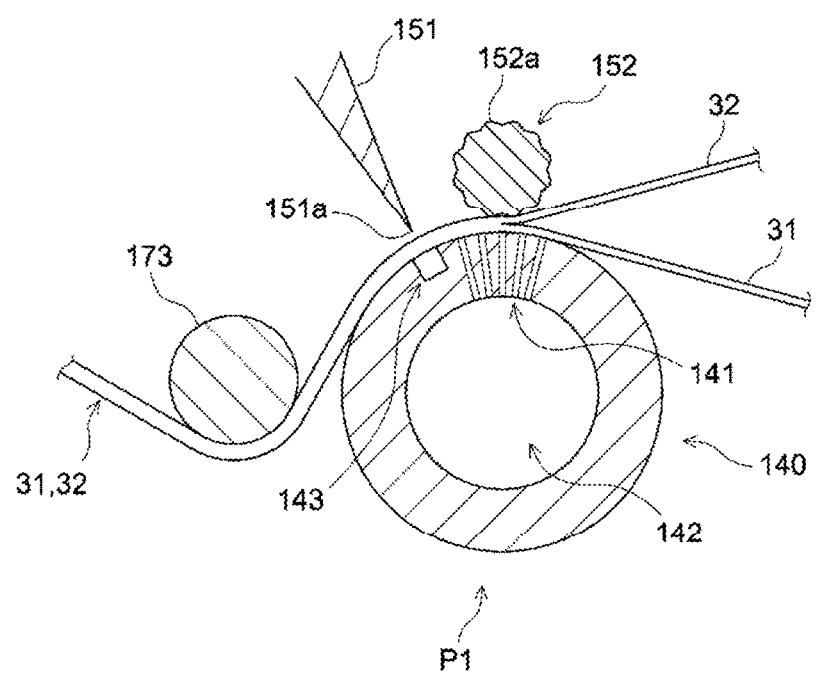
FIG. 7 is a cross-sectional view schematically illustrating a winding core 140 disposed at a first position P1.

FIG. 7 is a cross-sectional view schematically illustrating a winding core 140 disposed at the first position P1. The winding core 140 is a substantially cylindrical member. FIG. 7 shows a winding core 140 viewed in an axial direction, which illustrates a state in which, as shown in FIG. 3, the first separator 31 and the second separator 32 are wound around the winding core 140 disposed at the first position P1. The winding core 140 has the function to retain the separators 31 and 32 that are to be wound on its circumferential surface, as illustrated in FIG. 4. In this embodiment, the winding core 140 includes suction holes 141, a suction passage 142, and a groove 143. The suction holes 141 are holes provided for the purpose of suction-attaching the separators 31 and 32 to be wound on the circumferential surface. The suction passage 142 is a flow passage that is formed inside the winding core 140 and is in communication with the suction holes 141. The suction passage 142 is a flow passage provided for the purpose of providing negative pressure to the suction holes 141. The suction passage 142 may be configured to, for example, be connected to a vacuum line (not shown) that is provided externally, to provide negative pressure. The groove 143 is formed as a receiving portion that receives a blade of the cutter 151 when the separators 31 and 32 are cut. In this embodiment, the groove 143 is formed in the outer circumferential surface of the winding core 140 along the axial direction of the winding core 140. Although the winding core 140 is in a substantially cylindrical shape in this embodiment, it is also possible to use a flat winding core when the winding needs to be in a flat shape. The winding core may be such a winding core that is divided along a radial direction. The winding core divided along a radial direction may be such that the diameter of the winding core is variable.

Cutter 151

The cutter 151 is a cutter that cuts the separators 31 and 32. The cutter 151 is configured so that its blade 151a is pressed against the separators 31 and 32 that are retained on the winding core 140 disposed at the first position P1. In this embodiment, the cutter 151 may be pushed along a guide to a position defined so that the blade 151a can be pressed against the separators 31 and 32 retained on the winding core 140, and may be retracted from that position. Although not shown in the drawings, the cutter 151 is operated so as to be actuated at appropriate timing by an actuator (for example, a cylinder mechanism). The blade 151a may be, for example, a wavy blade (saw blade).

Presser Roller 152

The presser roller 152 is a roller that presses the separators 31 and 32 against the winding core 140 disposed at the first position P1. The separators 31 and 32 are wound while being pressed onto the winding core 140 disposed at the first position P1 by such a presser roller 152. The presser roller 152 functions as a presser jig that presses the separators 31 and 32 against the winding core 140 disposed at the first position P1. In this embodiment, as illustrated in FIG. 7, the presser roller 152 is provided with a plurality of protrusions 152a formed on the outer circumferential surface. In the example shown in FIG. 7, the plurality of protrusions 152a are corrugations. As the roller 152 provided with such protrusions 152a causes the two separators 31 and 32 to be pressed against the winding core 140, the protrusions 152a serve to intensively apply the force locally, so that the separators 31 and 32 can be pressed strongly. As a result, the separators 31 and 32 are pressed to stick together more suitably. The presser roller 152 may be, for example, in a substantially cylindrical shape, and the circumferential surface thereof may be knurled. The presser roller 152 may be configured to press the separators 31 and 32 onto the winding core 140 disposed at the first position P1 at an appropriate pressure by means of, for example, a mechanism interiorly equipped with a spring or the like. Also, by means of a guide and an actuator that are not shown in the drawings, the presser roller 152 is moved between a position (see FIG. 3) at which it is pressed onto the separators 31 and 32 that are wound on the winding core 140 disposed at the first position P1 and a position (see FIG. 5) at which it is detached from the winding core 140. The presser roller 152 may be composed of a single cylindrical roller provided along a lateral direction of the winding core 140, or may include a plurality of rollers intermittently disposed along the lateral direction of the winding core 140.

Stationary Roller 161, Movable Roller 171

The stationary roller 161 is provided at a position at which the transfer path k3 of the first separator 31 and the transfer path k1 of the positive electrode plate 21 merge. The movable roller 171 is a roller that presses the first separator 31 onto the stationary roller 161 to clamp the first separator 31 therebetween. The movable roller 171 is moved in a predetermined direction by means of a guide and an actuator. The movement of the movable roller 171 is controlled by the controller 200. The movable roller 171 is configured to be movable between a position at which it presses the first separator 31 against the stationary roller 161 and a position at which it is detached from the stationary roller 161. The movable roller 171 may be configured to clamp the first separator 31 with a predetermined force by, for example, a spring or the like, when the first separator 31 needs to be clamped. The first separator 31 is clamped by the stationary roller 161 and the movable roller 171 with an appropriate force so that it can be delivered toward the winding core 140 without slack.

Stationary Roller 162, Movable Roller 172

The stationary roller 162 is provided at a position at which the transfer path k4 of the second separator 32 and the transfer path k2 of the negative electrode plate 22 merge. The movable roller 172 is a roller that presses the second separator 32 onto the stationary roller 162 to clamp the second separator 32 therebetween. The movable roller 172 is moved in a predetermined direction by means of a guide and an actuator. The movement of the movable roller 172 is controlled by the controller 200. The movable roller 172 is configured to be movable between a position at which it presses the second separator 32 against the stationary roller 162 and a position at which it is detached from the stationary roller 162. The movable roller 172 may be configured to clamp the second separator 32 with a predetermined force by, for example, a spring or the like, when the second separator 32 needs to be clamped. The second separator 32 is clamped by the stationary roller 162 and the movable roller 172 with an appropriate force so that it can be delivered toward the winding core 140 without slack.

Stationary Roller 163

The stationary roller 163 is disposed at a predetermined position in the transfer path k3 of the first separator 31, and the stationary roller 163 serves to determine the transfer path k3 of the first separator 31.

First Chuck 181

As illustrated in FIG. 3, the first chuck 181 is disposed in front of a pair of rollers 161 and 171 that clamp the first separator 31, in the transfer path k1 in which the positive electrode plate 21 is delivered. The first chuck 181 is a member that grips the positive electrode plate 21. In this embodiment, the first chuck 181 includes a pair of gripping members. Although not shown in the drawings, the first chuck 181 includes a cutter that cuts the positive electrode plate 21. Although not shown in the drawings, the first chuck 181 is operated at appropriate timing by a guide and an actuator (for example, a cylinder mechanism). The operation of the first chuck 181 is configured to be controlled by the controller 200.

In the state shown in FIG. 3, the first separator 31 is retained by the winding core 140 disposed at the first position P1 and is sandwiched by the pair of rollers 161 and 171, to extend along the transfer path k3. The first chuck 181 grips the positive electrode plate 21 in front of the pair of rollers 161 and 171. When the positive electrode plate 21 is taken up on the winding core 140 disposed at the first position P1, the first chuck 181 inserts the retained positive electrode plate 21 into the gap between the pair of rollers 161 and 171, and releases the positive electrode plate 21, as illustrated in FIG. 4. Thereby, the positive electrode plate 21, together with the first separator 31, is pulled between the pair of rollers 161 and 171 and is taken up on the winding core 140 disposed at the first position P1. When the positive electrode plate 21 is delivered by a predetermined length, the winding core 140 stops the take-up operation. The positive electrode plate 21 is gripped by the first chuck 181 and is cut between the first chuck 181 and the pair of rollers 161 and 171. The first chuck 181 is configured to move appropriately between a predetermined position at which it grips the positive electrode plate 21 and a predetermined position at which it inserts the positive electrode plate 21 into the gap between the pair of rollers 161 and 171.

Second Chuck 182

As illustrated in FIG. 3, the second chuck 182 is disposed in front of a pair of rollers 162 and 172 that clamp the second separator 32, in the transfer path k2 in which the negative electrode plate 22 is delivered. The second chuck 182 is a member that grips the negative electrode plate 22. In this embodiment, the second chuck 182 includes a pair of gripping members. Although not shown in the drawings, the second chuck 182 includes a cutter that cuts the negative electrode plate 22. Although not shown in the drawings, the second chuck 182 is operated at appropriate timing by a guide and an actuator (for example, a cylinder mechanism). The operation of the second chuck 182 is configured to be controlled by the controller 200.

In the state shown in FIG. 3, the second separator 32 is retained by the winding core 140 disposed at the first position P1 and is sandwiched by the pair of rollers 162 and 172, to extend along the transfer path k4. The second chuck 182 grips the negative electrode plate 22 in front of the pair of rollers 162 and 172. When the negative electrode plate 22 is taken up on the winding core 140 disposed at the first position P1, the second chuck 182 inserts the retained negative electrode plate 22 into the gap between the pair of rollers 162 and 172, and releases the negative electrode plate 22, as illustrated in FIG. 4. Thereby, the negative electrode plate 22, together with the second separator 32, is pulled between the pair of rollers 162 and 172 and is taken up on the winding core 140 disposed at the first position P1. As mentioned previously, when the positive electrode plate 21 is delivered by a predetermined length, the winding core 140 stops the take-up operation. In other words, when the negative electrode plate 22 is delivered by a predetermined length, the winding core 140 stops the take-up operation. The negative electrode plate 22 is gripped by the second chuck 182 and is cut between the second chuck 182 and the pair of rollers 162 and 172. The second chuck 182 is configured to move appropriately between a predetermined position at which it grips the negative electrode plate 22 and a predetermined position at which it inserts the negative electrode plate 22 into the gap between the pair of rollers 162 and 172.

The positive electrode plate 21 and the negative electrode plate 22 may be inserted respectively between the pair of rollers 161 and 171 and between the pair of rollers 162 and 172, for example, after the first separator 31 and the second separator 32 are wound approximately one time around the outer circumferential surface of the winding core 140.

Movable Roller 173

As illustrated in FIG. 6, the movable roller 173 is a roller that presses the first separator 31 and the second separator 32 against the winding core 140 disposed at the first position P1 when the first separator 31 and the second separator 32 are cut. The movable roller 173 is moved in a predetermined direction by means of a guide and an actuator. The movement of the movable roller 173 is controlled by the controller 200. As illustrated in FIG. 6, when the first separator 31 and the second separator 32 are cut, the movable roller 173 is disposed at a position at which the movable roller 173 presses the first separator 31 and the second separator 32 against the winding core 140 disposed at the first position P1. At other times, the movable roller 173 moves to, as illustrated in FIG. 3, a position that is detached from the winding core 140 disposed at the first position P1. The movable roller 173 may be configured to clamp the first separator 31 with a predetermined force by, for example, a spring or the like, when it presses the first separator 31 and the second separator 32 against the winding core 140.

As illustrated in FIG. 6, the cutter 151 is pressed against the winding core 140 disposed at the first position P1 so that the first separator 31 and the second separator 32 can be cut. In this embodiment, as illustrated in FIG. 7, the groove 143 is formed in the outer circumferential surface of the winding core 140. When the cutter 151 is pressed against the winding core 140, the groove 143 formed in the outer circumferential surface of the winding core 140 is disposed to face the position where the cutter 151 is pressed. With the groove 143 disposed so as to face the cutter 151, the first separator 31 and the second separator 32 are pressed against the winding core 140. This allows the first separator 31 and the second separator 32 to be attached to the winding core 140. Further, in this state, the cutter 151 is pressed against the first separator 31 and the second separator 32 that is retained on the winding core 140. As a result, the first separator 31 and the second separator 32 are cut. Because the blade of the cutter 151 goes into the groove 143 of the winding core 140, the first separator 31 and the second separator 32 can be cut more reliably and more cleanly. Moreover, the winding core 140 is unlikely to be damaged, and contaminants are unlikely to form.

Movable Roller 174

The movable roller 174 is a roller that applies tension to the first separator 31 and the second separator 32, as illustrated in FIG. 6, when the first separator 31 and the second separator 32 are cut. The movable roller 174 is moved in a predetermined direction by means of a guide and an actuator. The movement of the movable roller 174 is controlled by the controller 200.

For example, as illustrated in FIG. 4, the positive electrode plate 21, the first separator 31, the negative electrode plate 22, and the second separator 32 are stacked respectively and wound up by the winding core 140(1) disposed at the first position P1. The winding core 140(1), which has taken up the positive electrode plate 21, the first separator 31, the negative electrode plate 22, and the second separator 32, moves from the first position P1 to the second position P2, as illustrated in FIG. 5. At that time, another winding core 140(2) moves to the first position P1. Then, as illustrated in FIG. 6, the first separator 31 and the second separator 32 are suction-attached to the winding core 140(2), which is newly disposed at the first position P1, so that the first separator 31 and the second separator 32 are retained on the outer circumferential surface of the winding core 140(2). At this time, the first separator 31 and the second separator 32 that have been wound up on the winding core 140(1) disposed at the second position P2 are retained in a continuous condition on the outer circumferential surface of the winding core 140(2) disposed at the first position P1.

When the winding core 140(1) moves from the first position P1 to the second position P2, the movable roller 174 is pushed toward the first separator 31 and the second separator 32 at appropriate timing, so as to be pressed onto the first separator 31 and the second separator 32, as illustrated in FIG. 6. By the movable roller 174, the first separator 31 and the second separator 32 are delivered without causing slack when the winding core 140(1) moves from the first position P1 to the second position P2. Other than this timing, the movable roller 174 is retracted to a position away from the turret 120, as illustrated in FIGS. 3 to 5.

Index Unit 185

The index unit 185 is provided at a central portion of the turret 120. On the turret 120, the three winding cores 140(1)-(3) are distributed uniformly along the circumferential direction, as described previously. The index unit 185 includes a substantially equilateral triangular shaped base that rotates together with the turret 120. At the apexes of the base, respective index rollers 186 to 188 are disposed, and the index rollers 186 to 188 are disposed respectively between the three winding cores 140(1)-(3).

The index unit 185 is constructed as follows. When the winding core 140(1) on which the positive electrode plate 21, the first separator 31, the negative electrode plate 22, and the second separator 32 are wound is moved from the first position P1 to the second position P2, one of the index rollers 186 to 188 that is placed from the first position P1 to the second position P2, namely the index roller 186, is pressed against the first separator 31 and the second separator 32 from radially inside. Such an index roller 186 and the movable roller 174 allow the first separator 31 and the second separator 32 to be delivered between the first position P1 and the second position P2 without causing slack. At the time shown in FIG. 6, the index roller 186 presses the first separator 31 and the second separator 32 from radially inside, and the index unit 185 rotates with rotation of the turret 120. Thus, the index rollers 186 to 188 of the index unit 185 each sequentially function, one by one, as a roller that presses the first separator 31 and the second separator 32 from radially inside when the winding core 140 around which the positive electrode plate 21, the first separator 31, the negative electrode plate 22, and the second separator 32 have been wound is moving from the first position P1 to the second position P2.

Winding Termination Device 190

As illustrated in FIG. 6, for example, the winding core 140(1), which has rolled up the positive electrode plate 21, the first separator 31, the negative electrode plate 22, and the second separator 32, moves to the second position P2, which is away from the first position P1. Then, after the separators 31 and 32 are cut, the cut portions of the separators 31 and 32 are rolled up to the cut edge portions. The winding termination device 190 is disposed at the second position P2.

The winding termination device 190 includes a presser roller 191 and a tape attaching device 192. When the winding core 140 that has moved to the second position P2 rolls up the cut portions of the positive electrode plate 21, the first separator 31, the negative electrode plate 22, and the second separator 32 to the cut edge portions, the presser roller 191 is pressed against an outermost circumference portion of the second separator 32 that is wound around the winding core 140(1). As a result, the cut portions of the positive electrode plate 21, the first separator 31, the negative electrode plate 22, and the second separator 32 can be wound up without causing slack. The tape attaching device 192 is a device that attaches a tape for fixing the cut edge portion of the outermost circumference of the second separator 32 or the first separator 31. Such a winding termination process may be performed, for example, in parallel with the process of winding the first separator 31, the positive electrode plate 21, and the second separator 32, and the negative electrode plate 22 around the winding core 140(2) that is newly disposed at the first position P1.

Furthermore, in this embodiment, as illustrated in FIG. 6, for example, the winding machine 100 performs the winding termination process and newly winds up the positive electrode plate 21, the first separator 31, the negative electrode plate 22, and the second separator 32 on the winding core 140(2) disposed at the first position P1. Thereafter, the winding machine 100 allows the turret 120 to rotate. The winding core 140(1), for which the winding termination process has been performed, is moved to the third position P3, the winding core 140(2) is moved to the second position P2, and further another winding core 140(3) is disposed at the first position P1. At this time, the first separator 31 and the second separator 32 that have been wound up on the winding core 140(2) disposed at the second position P2 are retained in a continuous condition on the outer circumferential surface of the winding core 140(3) disposed at the first position P1. Then, after the separators 31 and 32 are cut, the winding termination process for the winding core 140(2) is performed at the second position P2. At the first position P1, the positive electrode plate 21, the first separator 31, the negative electrode plate 22, and the second separator 32 are newly wound around the winding core 140(3). At the third position P3, a wound stack 20a is removed from the winding core 140(1) (see FIG. 3). After removed from the winding core 140(1), the wound stack 20a is pressed into a flat shape, which can be handled as a wound electrode assembly 20. Thus, the winding cores 140(1)-(3) provided on the turret 120 move from the first position P1 to the third position P3 sequentially. The positive electrode plate 21, the first separator 31, the negative electrode plate 22, and the second separator 32 are continuously wound around the winding cores 140(1)-(3) one after another.

The present inventors have discovered that, in manufacturing batteries 2 using the winding machine 100 as described above, there is still room for improvement in, for example, suction-attaching of separators 31 and 32 to the winding core 140 and ways of removing the wound stack 20a from the winding core 140. The present inventors believe that production efficiency can be improved by using winding cores 140A and 140B described below as the winding core 140.

Winding Core 140A

Figure 8:
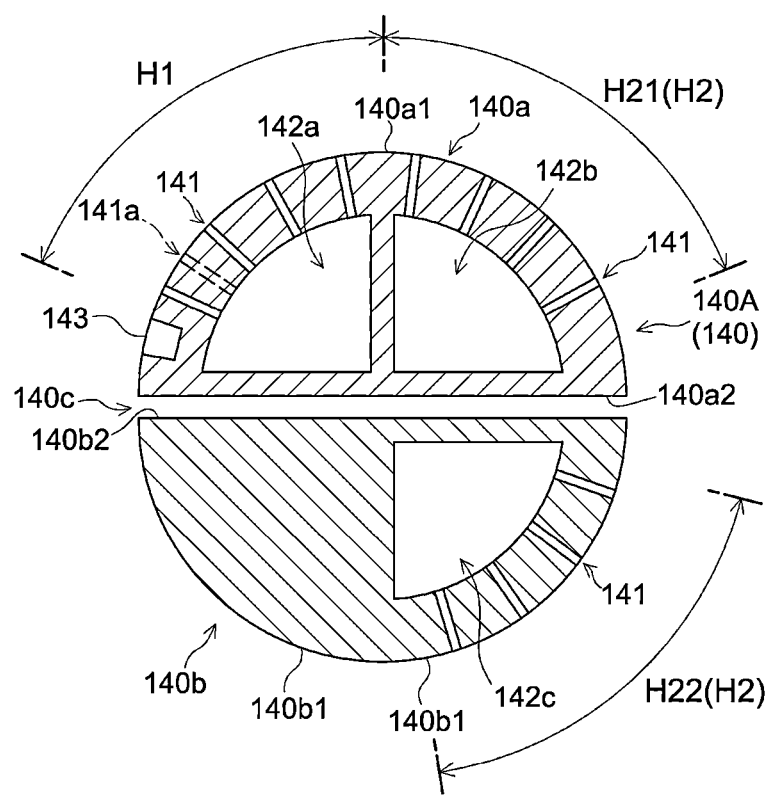
FIG. 8 is a cross-sectional view of a winding core 140A.
Figure 9:
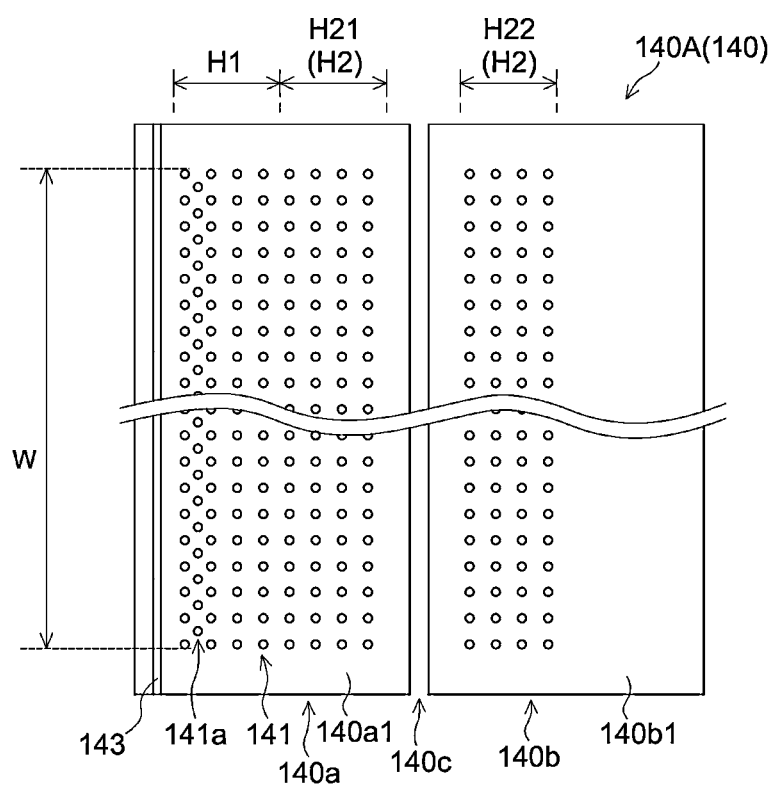
FIG. 9 is a schematic view illustrating the structure of the outer circumferential surface of the winding core 140A.

FIG. 8 is a cross-sectional view of a winding core 140A. FIG. 9 is a schematic view illustrating the outer circumferential surface of the winding core 140A. FIG. 9 shows a view in which the winding core 140A is virtually unrolled along the circumferential direction so that the entire outer circumferential surface of the winding core 140A can be shown in a plane. As illustrated in FIG. 8, the winding core 140A includes a first component 140a and a second component 140b. Each of the first component 140a and the second component 140b is a substantially semi-cylindrical shaped member. The first component 140a and the second component 140b includes respective outer circumferential surfaces 140a1 and 140b1 onto which the separators 31 and 32 are to be wound. The first component 140a and the second component 140b respectively include flat surfaces 140a2 and 140b2 each facing the other component.

At least one of the first component 140a and the second component 140b can move in a radial direction of the winding core 140A so as to change the diameter of the winding core 140A. In other words, the winding core 140A is configured to be openable and closable so as to change the gap between the first component 140a and the second component 140b. FIG. 8 shows the winding core 140A in an open state. A clearance gap 140c is formed between the first component 140a and the second component 140b of the winding core 140A, i.e., between the flat surfaces 140a2 and 140b2. When the winding core 140A is in the open state, the separators 31 and 32 (see FIG. 7) are wound onto the outer circumferential surfaces 140a1 and 140b1 of the winding core 140A. In the closed state, the clearance gap between the flat surfaces 140a2 and 140b2 is narrower. In this embodiment, the flat surfaces 140a2 and 140b2 are configured to come into contact with each other when the winding core 140A is in the closed state. The opening and closing mechanism for the first component 140a and the second component 140b is not limited to a particular mechanism. For example, the opening and closing of the first component 140a and the second component 140b may be effected by a cylinder mechanism or the like.

The winding core 140A includes holes 141, flow passages 142a to 142c, and a groove 143. The holes 141A are provided in the first component 140a and the second component 140b. The flow passages 142a, 142b and the groove 143 are provided in the first component 140a. The flow passage 142c is provided in the second component 140b.

The holes 141 are formed in the outer circumferential surfaces 140a1 and 140b1 of the winding core 140A. The holes 141 are in communication with the flow passages 142a to 142c formed inside the winding core 140A. The holes 141 are configured to be able to cause suction or gas discharge through the holes 141 by adjusting the pressure inside the flow passages 142a to 142c. Performing suction through the holes 141 allows the separators 31 and 32 to be suction-attached to the winding core 140A. Discharging gas through the holes 141 makes it possible to form a layer of gas between the separators 31, 32 and the winding core 140A. The type of gas to be discharged through the holes 141 is not particularly limited. Examples of the gas to be discharged through the holes 141 include air and nitrogen gas. The shape of the holes 141 may be, but is not particularly limited to, a circular shape or a polygonal shape, for example. From the viewpoint of ease of processing, the shape of the holes 141 may preferably be a substantially round shape including a circular shape and an elliptic shape.

A first hole group H1 and a second hole group H2 are formed in the outer circumferential surfaces 140a1 and 140b1 of the winding core 140A. The first hole group H1 and the second hole group H2 are formed independently from each other and are not in communication with each other inside. The first hole group H1 and a second hole group H21 are formed in the first component 140a. A second hole group H22 is also formed in the second component 140b.

Each of the first hole group H1 and the second hole group H2 includes a plurality of holes 141. The holes 141 included in the first hole group H1 are in communication with each other via the flow passage 142a inside the first component 140a. The second hole group H2 includes the second hole group H21, which is provided in the first component 140a, and the second hole group H22, which is provided in the second component 140b. Like the first hole group H1, the holes 141 included in the second hole groups H21 and H22 are in communication with each other in their respective groups. Herein, in each of the second hole groups H21 and H22, the holes are in communication with each other through respective different flow passages 142b and 142c. The holes 141 included in the second hole group H21 are in communication with each other via the flow passage 142b inside the first component 140a. The holes 141 included in the second hole group H22 are in communication with each other via the flow passage 142c inside the first component 140a.

The suction and gas discharge through the first hole group H1 and the suction and gas discharge through the second hole group H2 can be controlled independently from each other. In other words, the first hole group H1 and the second hole group H2 are configured to be controllable so as to cause suction and gas discharge independently from each other.

The winding core 140A is configured to apply suction to at least one of the first separator 31 and the second separator 32 through the first hole group H1, to thereby suction-attach the one of the first separator 31 and the second separator 32 to the winding core 140A. In addition, the winding core 140A applies suction to at least one of the first separator 31 and the second separator 32 through the second hole group H2, to thereby suction-attach to the one of the first separator 31 and the second separator 32 to the winding core 140A. The winding core 140A also discharges gas through the second hole group H2. The just-mentioned gas discharge is performed in the later-described step of removing a wound electrode assembly from the winding core 140A. In this embodiment, the first hole group H1 is used to cause suction and the second hole group H2 is used to discharge gas. In other words, the mechanism for suction-attaching the separators 31 and 32 is equipped for the first component 140a, which is provided with the first hole group H1. The mechanism for discharging gas is equipped for both the first component 140a, which is provided with the second hole group H21, and the second component 140b, which is provided with the second hole group H22.

The first hole group H1 is able to cause the separators 31 and 32 to be suction-attached to the winding core 140 by bringing the inside of the flow passage 142a of the first component 140a into negative pressure. The flow passage 142a may be configured to, for example, be connected as appropriate to a vacuum line (not shown) that is provided externally, to provide negative pressure. The flow passage 142a may be provided with an atmosphere relief valve (not shown) externally so that the flow passage 142a can be opened to the atmospheric pressure.

The second hole group H21 is able to discharge gas by bringing the flow passage 142b inside the first component 140a into positive pressure. Also, the second hole group H22 is able to discharge gas by bringing the flow passage 142c inside the second component 140b into positive pressure. Discharging gas through the second hole group H2 makes it possible to remove the wound stack 20a (see FIG. 6) from the winding core 140A easily. The flow passages 142b and 142c may be configured to, for example, be connected to an air supply line (not shown) that is provided externally, to provide positive pressure. The flow passages 142b and 142c may be connected externally to the same air supply line so that the pressure can be controlled simultaneously. Alternatively, the flow passages 142b and 142c may be connected externally to different air supply lines so that the pressure can be controlled independently. The flow passages 142b and 142c each may be provided with an atmosphere relief valve (not shown) externally so that the flow passages 142b and 142c can be opened to the atmospheric pressure.

Each of the flow passage 142a, which communicates with the first hole group H1, and the flow passages 142b and 142c, which communicate with the second hole group H2, may be configured to be able to select the pressure between a positive pressure and a negative pressure. For example, the flow passages 142a to 142c each may be connected to an air supply line and a vacuum line externally of the winding core 140A. That is, the positive pressure and the negative pressure of the flow passages 142a to 142c may be switched from one to the other so that the location at which the separators 31 and 32 are sucked, the location at which gas is discharged, and the timing of suction and gas discharge can be set appropriately.

As illustrated in FIG. 9, the holes 141 are arrayed at a regular pitch along the axial direction of the winding core 140A. The plurality of holes 141 arrayed along the axial direction are provided in a plurality of rows arrayed along the circumferential direction. Although not limited thereto, the width W of the region in which the holes 141 are formed may preferably be less than the width of the separators 31 and 32 that are wound thereon, from the viewpoint of preventing air leakage.

The winding core 140A includes a groove 143 formed along a direction in which the winding core 140A extends (i.e., along the axial direction). The groove 143 is formed in a circumferential end portion of the outer circumferential surface 140a1 of the winding core 140A. The groove 143 is formed as a receiving portion in which the blade of the cutter 151 is put down when the separators 31 and 32 are cut (see FIG. 7).

As described above, the first component 140a includes the first component 140a and the second hole group H21. The groove 143 is provided circumferentially closer to the first hole group H1 than the second hole group H21. Thus, because the groove 143 is provided closer to the first hole group H1, through which the separators 31 and 32 are sucked, the portion of the cut separators 31 and 32 that is the starting end of winding is easily wound on the winding core 140A.

The holes 141 are formed in a predetermined pattern along the axial direction and the circumferential direction of the winding core 140A. The holes 141 are provided at a regular pitch along the axial direction and the circumferential direction. The size and pitch of the plurality of suction holes 141 are not particularly limited. The pitch of the holes 141 may be less than or equal to 10 mm, or may be less than or equal to 5 mm, for example. In the outer circumferential surfaces 140a1 and 140b1, there may be a portion in which the pitch between the holes 141 is narrower. There may be a portion in which a greater number of holes 141 are provided. There may be a portion in which no hole 141 is formed. The pitch and size of the holes 141 may vary gradually along the axial direction or the circumferential direction of the winding core 140A.

In this embodiment, the first hole group H1 includes additional holes 141a. The additional holes 141a are arrayed in one row along the axial direction. The additional holes 141a are provided between the row of the holes 141 that is closest to the groove 143 and the row next closest to the groove 143. The pitch of the additional holes 141a is the same as the pitch of the holes 141. Each of the additional holes 141a is provided at a midway position between adjacent holes 141 along the axial direction.

Thus, because the additional holes 141a are provided at positions close to the groove 143, the portion of the separators 31 and 32 that is the starting end of winding can be suction-attached thereto more firmly. As a result, the separators 31 and 32 can be wound onto the winding core 140A more easily, and the shape of the starting end of winding of the separators 31 and 32 can be stabilized. It is also possible that, not just one, but a plurality of such additional holes 141a may be provided. When the region provided with the first hole group H1 is divided into two equally-sized regions, for example, the additional holes 141a may be provided in one of the regions that is closer to the groove 143. Alternatively, for example, in place of providing the additional holes 141a, the pitch of the holes 141 may be made smaller in the just-mentioned one of the regions closer to the groove 143. As a result, the number of the holes 141 per unit area increases, so the starting end portion of winding of the separators 31 and 32 can be suction-attached more firmly, as with the above-described embodiment.

Winding Core 140B

Figure 10:
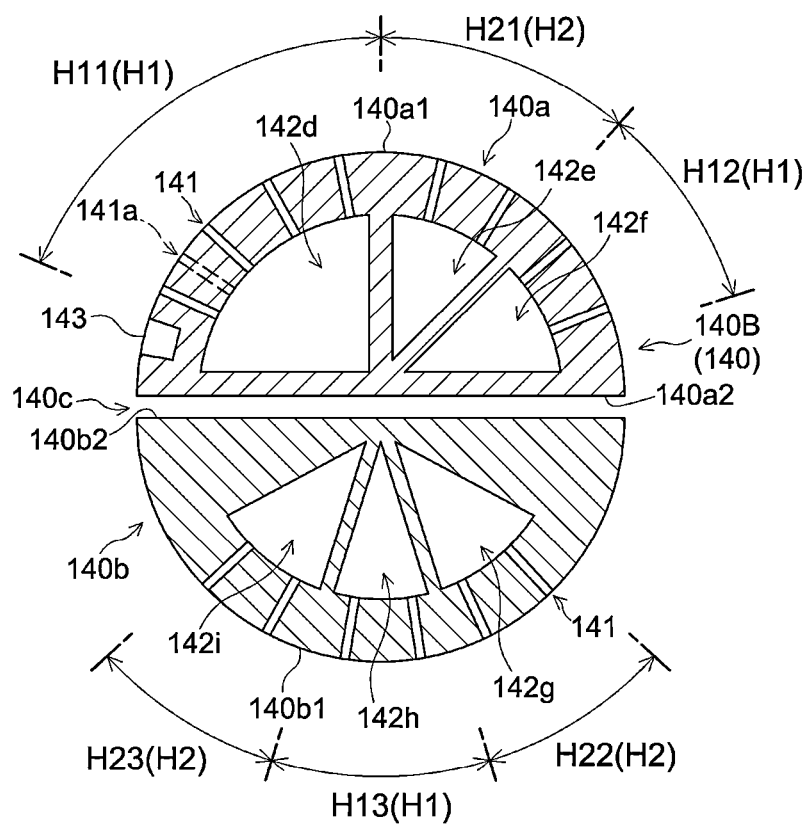
FIG. 10 is a cross-sectional view of a winding core 140B.
Figure 11:
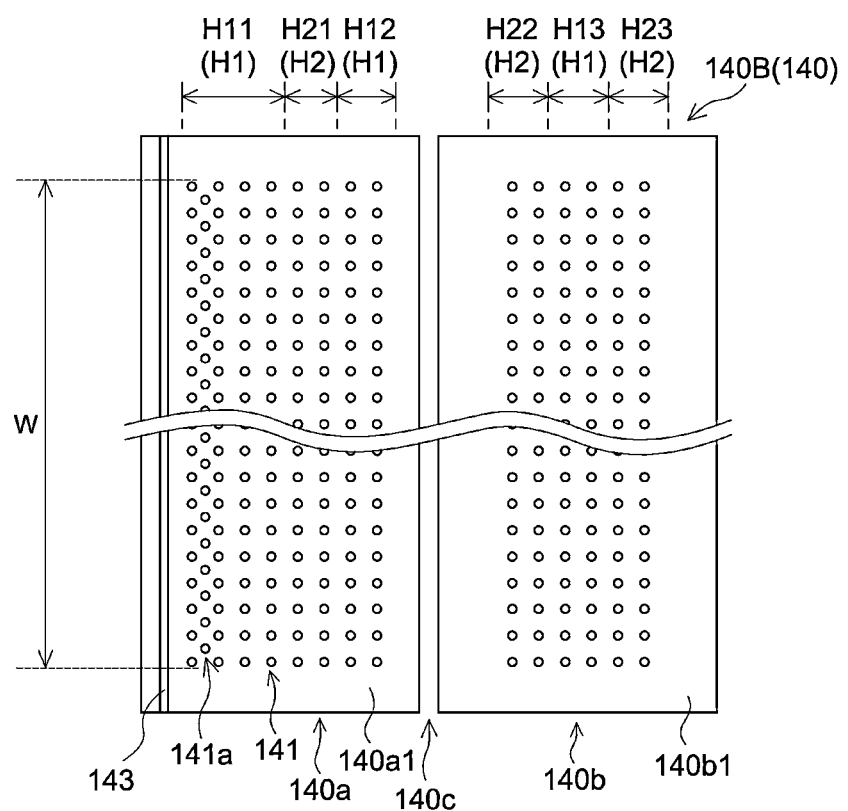
FIG. 11 is a schematic view illustrating the structure of the outer circumferential surface of the winding core 140B.

FIG. 10 is a cross-sectional view of a winding core 140B. FIG. 11 is a schematic view illustrating the outer circumferential surface of the winding core 140B. FIG. 11 shows a view in which the winding core 140B is virtually unrolled along the circumferential direction so that the entire outer circumferential surface of the winding core 140B can be shown in a plane. In FIGS. 10 to 11, identical reference characters and descriptions are used to designate the elements or features illustrated in FIGS. 8 and 9, and repetitive description thereof may be omitted as appropriate.

The winding core 140B includes holes 141, flow passages 142d to 142i, and a groove 143. The holes 141A are provided in the first component 140a and the second component 140b. The flow passages 142d to 142f and the groove 143 are provided in the first component 140a. The flow passages 142g to 142i are provided in the second component 140b. The holes 141 are in communication with the flow passages 142d to 142i formed inside the winding core 140B. Like the flow passages 142a to 142c, the flow passages 142d to 142i are configured to be able to cause suction or gas discharge through the holes 141 by adjusting the pressure.

The winding core 140B includes a first hole group H1 and a second hole group H2. The first hole group H1 and the second hole group H2 are provided in both the first component 140a and the second component 140b. The first hole group H1 includes first hole groups H11 and H12, which are provided in the first component 140a, and a first hole group H13, which is provided in the second component 140b. The holes 141 included in the first hole group H11 are in communication with each other via the flow passage 142d, the holes 141 included in the first hole group H12 are in communication with each other via the flow passage 142f, and the holes 141 included in the first hole group H13 are in communication with each other via the flow passage 142h. The second hole group H2 includes a second hole group H21, which is provided in the first component 140a, and second hole groups H22 and H23, which are provided in the second component 140b. The holes 141 included in the second hole group H21 are in communication with each other via the flow passage 142e, the holes 141 included in the second hole group H22 are in communication with each other via the flow passage 142g, and the holes 141 included in the second hole group H23 are in communication with each other via the flow passage 142i.

In the winding core 140B, the first hole groups H1 and the second hole groups H2 are disposed circumferentially alternately. Such a configuration allows suction and gas discharge in a circumferentially balanced manner.

In association with the method of manufacturing a battery 2 including a wound electrode assembly 20 in which a first separator 31, a negative electrode plate 22, a second separator 32, and a positive electrode plate 21 are wound together, the winding machine 100 including the winding core 140 (140A, 140B) as described above embodies the following steps (A) to (C).

Step (A): suction-attaching the first separator 31 to the winding core 140.

Step (B): winding the first separator 31 onto the winding core 140.

Step (C): removing the wound electrode assembly 20 from the winding core 140.

The winding core 140 includes a first hole group H1 and a second hole group H2 formed in the outer circumferential surfaces 140a1 and 140b1. The first hole group H1 and the second hole group H2 are configured to be controllable so as to cause suction and gas discharge independently from each other.

In step (A), suction is applied to the first separator 31 through at least one of the first hole group H1 and the second hole group H2, to suction-attach the first separator 31 to the winding core 140. As illustrated in FIG. 3, the first separator 31 is suction-attached to the winding core 140 that is disposed at the first position P1. In this embodiment, suction is applied to at least one of the first separator 31 and the second separator 32 through at least the first hole group H1, of the first hole group H1 and the second hole group H2, to suction-attach the at least one of the first separator 31 and the second separator 32 to the winding core 140. Suction is applied to the first separator 31 through the first hole group H1 (see FIGS. 8 to 11) with the first separator 31 being in contact with the first hole group H1. This allows the first separator 31 to be suction-attached to the winding core 140. As described previously, each of the separators 31 and 32 is a porous resin sheet. This means that suction through the holes 141 (see FIGS. 8 to 11) is also effected on the second separator 32 through the pores in the first separator 31. The second separator 31 is suction-attached on top of the first separator 31. In this way, the first separator 31 and the second separator 32 may preferably be suction-attached to the winding core 140 in a stacked condition.

In step (B), the first separator 31 is wound onto the winding core 140 together with the second separator 32. In this embodiment, the first separator 31 and the second separator 32 are wound approximately one time around the winding core 140. In step (B), the first separator 31 and the second separator 32 may preferably be wound together while performing suction through the first hole group H1. It is more preferable that the first separator 31 and the second separator 32 may be wound together while also performing suction through the second hole group H2. In addition, when winding the first separator 31 and the second separator 32 onto the winding core 140, the separators 31 and 32 may preferably wound around the winding core 140 with the separators 31 and 32 being pressed against the winding core 140 with a jig provided with a plurality of protruding portions on its surface, such as the presser roller 152.

Thereafter, as illustrated in FIG. 4, the positive electrode plate 21 and the negative electrode plate 22 are delivered from the transfer path k1 and the transfer path k2. Subsequently, the second separator 32, the negative electrode plate 22, the first separator 31, and the positive electrode plate 21 are stacked on top of each other and wound up onto the winding core 140(1) (see FIG. 5). At this time, suction through the first hole group H1 is performed continuously.

The first separator 31 and the second separator 32 are wound onto another winding core 140(2), which is a different one from the winding core 140(1) on which the positive electrode plate 21, the negative electrode plate 22, and the separators 31 and 32 have been wound. In this embodiment, the first separator 31 and the second separator 32 are cut on the winding core 140(2) with the first separator 31 and the second separator 32 being retained on the winding core 140(2). The winding of the separators 31 and 32 may be performed by suction through the first hole group H1, suction through the second hole group H2, the presser roller 152, and the like. Because the first separator 31 and the second separator 32 are cut while they are retained on the winding core 140, the cut position is stable. In addition, the downstream ends of the cut separators 31 and 32 are the portion that becomes the starting end of winding of a wound stack 20a (see FIG. 6) that is newly wound. Because this portion is retained on the winding core 140, the shape of the wound stack 20a that is newly wound can be made stable.

In this embodiment, the first separator 31 and the second separator 32 are cut at a location that faces the groove 143 (see FIG. 7) with the first separator 31 and the second separator 32 being retained on the winding core 140(2). Because the groove 143 is formed at the location on which the first separator 31 and the second separator 32 are cut, the winding core 140 is not hit by the blade of the cutter 151 (see FIG. 7), so damages to the winding core 140 are reduced.

In step (C), the wound electrode assembly 20 (wound stack 20a) is removed from the winding core 140. At this time, suction through the first hole group H1 is stopped. Also, gas is discharged through the second hole group H2. Accordingly, a layer of gas is formed between the first separator 31 and the outer circumferential surfaces 140a1 and 140b of the winding core 140. As a result, the wound electrode assembly 20 (wound stack 20a) can be detached from the winding core 140 easily.

In the embodiments described above, the winding core 140 includes the first hole group H1 and the second hole group H2, as illustrated in FIGS. 8 and 10. The first hole group H1 and the second hole group H2 are configured to cause suction and gas discharge independently from each other. Such a configuration prevents the air from leaking through the second hole group H2 in the suction-attaching in step (A). Therefore, the suction force in suction-attaching the separators 31 and 32 does not reduce, so the dimensional accuracy in the winding process is stable. As a result, it is possible to manufacture a wound electrode assembly 20 with a stable shape.

In the above-described embodiments, the winding core 140 includes a first component 140a and a second component 140b. At least one of the first component 140a and the second component 140b can move in a radial direction of the winding core 140 so as to change the diameter of the winding core 140. In step (C), when removing the wound electrode assembly 20 (wound stack 20a) from the winding core 140, the gap between the first component 140a and the second component 140b can be narrowed. As a result, the wound electrode assembly 20 (wound stack 20a) can be easily pulled away from the winding core 140.

In the winding core 140A of the embodiment shown in FIGS. 8 and 9, the first hole group H1 and the second hole group H21 are formed in the first component 140a. The second hole group H22 is formed in the second component 140b.

In the winding core 140B of the embodiment shown in FIGS. 10 and 11, the first hole groups H11, H12 and the second hole group H21 are formed in the first component 140a. The second hole groups H22, H23 and the first hole group H13 are formed in the second component 140b.

As described above, the arrangement of the first hole group H1 and the second hole group H2 are not particularly limited. The arrangement of the first hole group H1 and the second hole group H2 may be set appropriately depending on the location to which the separators 31 and 32 are suction-attached, the directions in which gas is discharged, and so forth.

In the above-described embodiments, the second hole group H2 is configured to discharge gas. However, the configuration of the second hole group H2 is not limited to such an embodiment. The second hole group H2 may be configured to cause at least one of the first separator 31 and the second separator 32 to be suction-attached thereto in at least one of step (A) and step (B), in addition to the gas discharging in step (C). Such a configuration enables the separators 31 and 32 to be suction-attached to a wide area of the outer circumferential surfaces 140a1 and 140b1 of the winding core 140. As a result, winding can be performed with high accuracy, and displacement in winding can be reduced.

Moreover, in the above-described embodiments, the first hole group H1 is configured to be able to suction-attach at least one of the first separator 31 and the second separator 32 thereto. However, the configuration of the first hole group H1 is not limited to such an embodiment. The first hole group H1 may be configured to be able to discharge gas in step (C), in addition to causing suction in step (A). Such a configuration allows gas discharge over a wide area of the outer circumferential surfaces 140a1 and 140b1 of the winding core 140. As a result, the wound electrode assembly 20 (wound stack 20a) can be removed easily.

Note that the wider the width of the first separator 31 and the second separator 32 is, the greater the contact area with the winding core 140, so the first separator 31 and the second separator 32 can be wound more stably. From such a viewpoint, the first separator 31 and the second separator 32 each may have a width of, for example, greater than or equal to 25 cm, more preferably greater than or equal to 30 cm.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

What is claimed is:

1. A method operatively associated with a winding machine for manufacturing a battery including a wound electrode assembly wherein a first separator, a negative electrode plate, a second separator, and a positive electrode plate are wound together, the method comprising steps of:
   suction-attaching the first separator to a winding core of the winding machine;

winding the first separator onto the winding core; and
removing a wound electrode assembly from the winding core, wherein:
the winding core includes a first group of holes and a second group of holes each formed in an outer circumferential surface of the winding core;
in the suction-attaching the first separator to the winding core, the suction is applied to the first separator through at least one of the first group of holes and the second group of holes, to suction-attach the first separator to the winding core; and
controlling the suction gas discharge of the first group of holes and the second group of holes independently from each other by a controller of the winding machine.

2. The method according to claim 1, wherein in the suction-attaching the first separator to the winding core, suction is applied to at least one of the first separator and the second separator through at least the first group of holes, to suction-attach the at least one of the first separator and the second separator to the winding core.

3. The method according to claim 2, wherein in the suction-attaching the first separator to the winding core, suction is applied to the first separator additionally through the second group of holes, to suction-attach the first separator to the winding core.

4. The method according to claim 1, wherein in the removing the wound electrode assembly from the winding core is carried out by discharging gas through the second group of holes.

5. The method according to claim 1, wherein in the removing the wound electrode assembly from the winding core is carried out by discharging gas through the first group of holes.

6. The method according to claim 1, wherein in the removing the wound electric assembly from the winding core, the first separator and the second separator are cut on the winding core with the first separator and the second separator being retained on the winding core.

7. The method according to claim 1, wherein the winding core includes a groove formed along a direction in which the winding core extends, and the first separator and the second separator are cut at a location that faces the groove with the first separator and the second separator being retained on the winding core.

8. The method according to claim 1, wherein the suction attaching the first separator to the winding core includes providing the winding core:
the winding core includes a first component and a second component;
at least one of the first component and the second component is movable in a radial direction of the winding core so as to change a diameter of the winding core; and
the first group of holes and the second group of holes are formed in the first component.

9. The method according to claim 1, wherein the suction attaching the first separator to the winding core includes providing the winding core:
the winding core includes a first component and a second component;
at least one of the first component and the second component is movable in a radial direction of the winding core so as to change a diameter of the winding core; and
the first group of holes are formed in the first component, and the second group of holes are formed in the second component.

10. The method according to claim 1, wherein the first separator and the second separator each have a width of greater than or equal to 25 cm.

* * * * *